No. 774,070. PATENTED NOV. 1, 1904.
C. E. & G. W. GOSS.
INCUBATOR.
APPLICATION FILED FEB. 29, 1904.
NO MODEL. 2 SHEETS—SHEET 2.
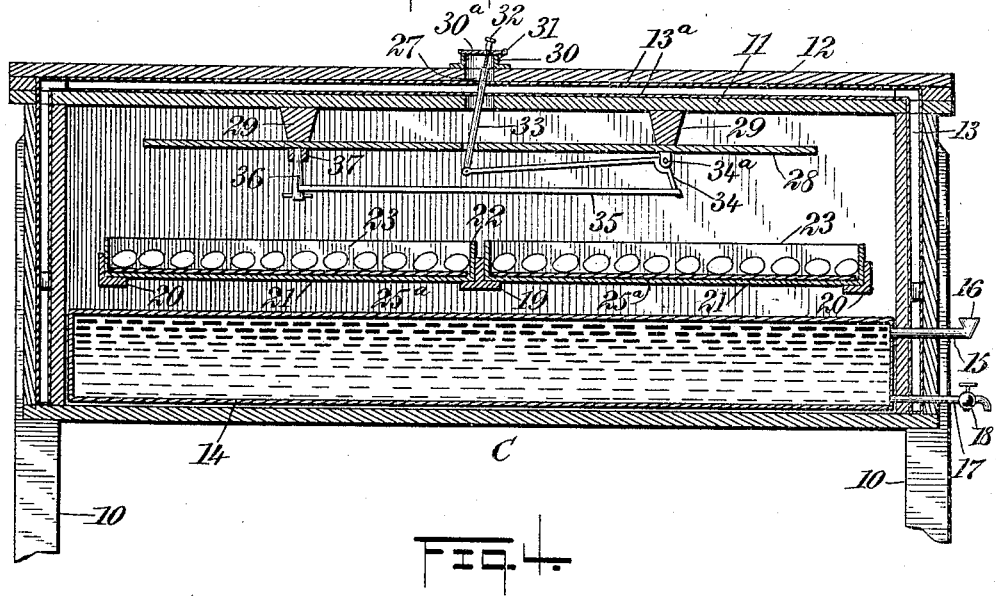
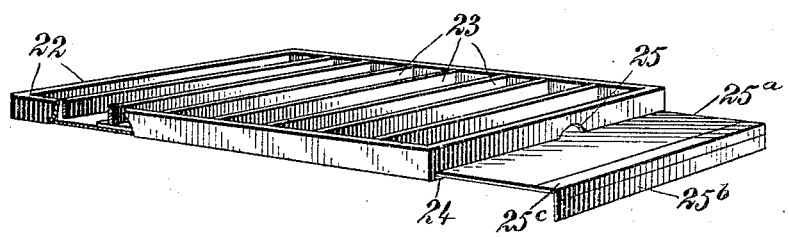
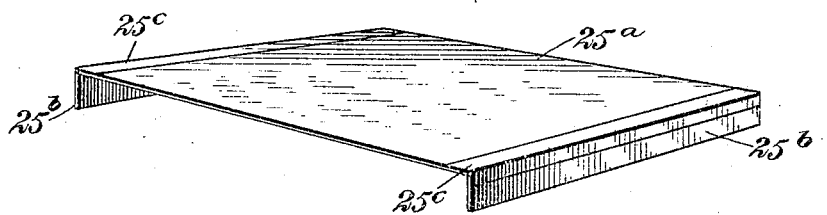
WITNESSES:
INVENTORS
Charles E. Goss
George W. Goss
BY
ATTORNEYS No. 774,070.

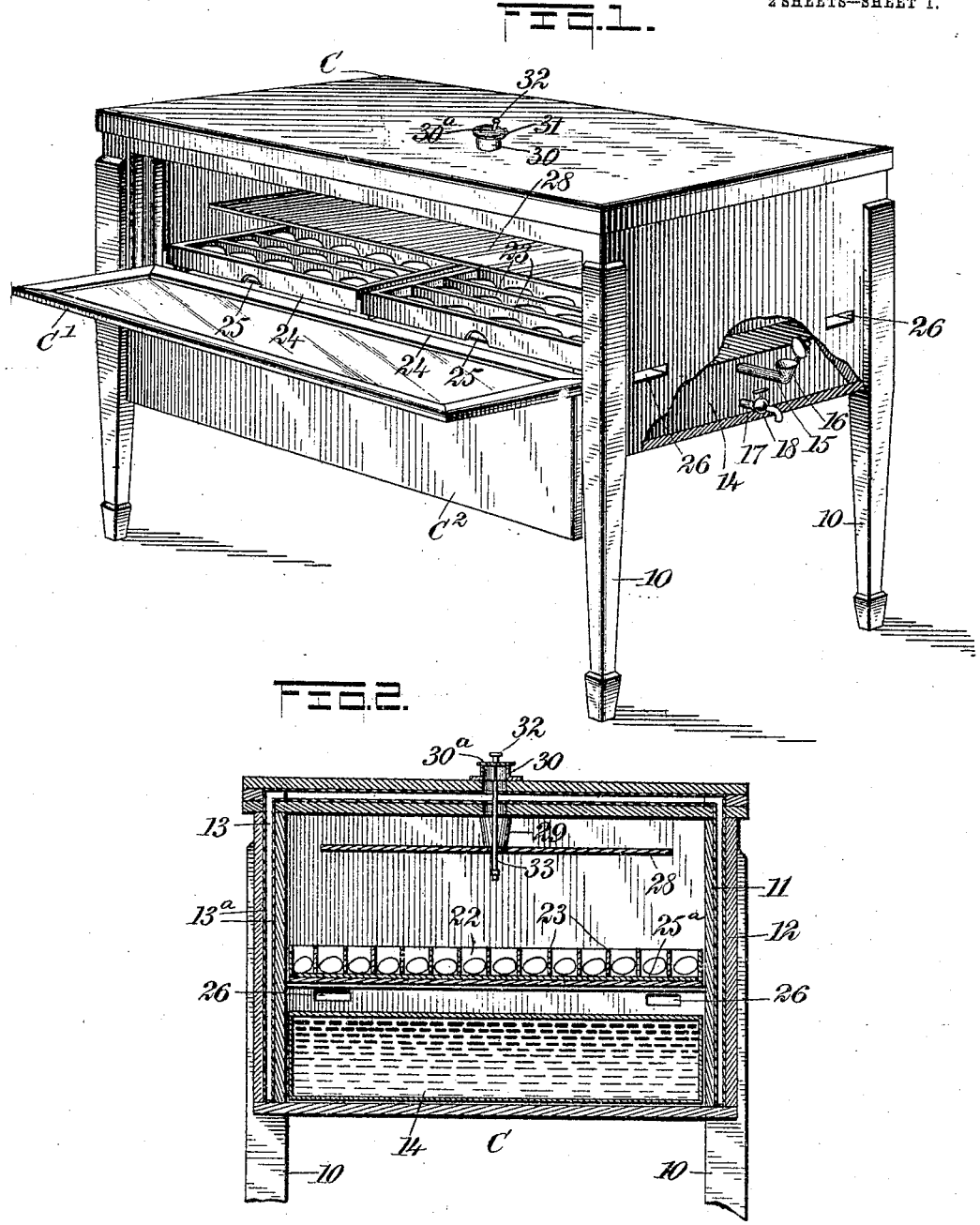

Patented November 1, 1904.

UNITED STATES PATENT OFFICE.

CHARLES EDWARD GOSS AND GEORGE WILSON GOSS, OF EDITH, TEXAS.

INCUBATOR.

SPECIFICATION forming part of Letters Patent No. 774,070, dated November 1, 1904.

Application filed February 29, 1904. Serial No. 195,803. (No model.)

*To all whom it may concern:*

Be it known that we, CHARLES EDWARD GOSS and GEORGE WILSON GOSS, both citizens of the United States, and residents of Edith, in the county of Coke and State of Texas, have invented a new and Improved Incubator, of which the following is a full, clear, and exact description.

Our invention relates to incubators; and it consists in the various features and combinations hereinafter described and more particularly claimed.

Reference is to be had to the accompanying drawings, forming a part of this specification, in which similar characters of reference indicate corresponding parts in all the figures.

Figure 1 is a perspective view of one embodiment of our invention, parts being broken away. Fig. 2 is a central vertical transverse section. Fig. 3 is a central vertical longitudinal section. Fig. 4 is a perspective view of one of the egg-trays, and Fig. 5 is a similar view of the movable or false bottom thereof.

C designates a casing, which will usually be of wood and which is provided with legs 10, of convenient height. This casing is preferably constructed with inner walls 11 and outer walls 12, between which is a dead-air space 13, serving to insulate the structure. If desired, further insulation may be provided in the form of a facing or lining of building-paper 13ª or the like upon the walls 11 and 12. In the bottom of the casing, substantially filling the lower portion, is a tank 14, preferably of metal, at the upper portion of one side of which is a supply-pipe 15, extending out through the casing-walls and provided at its end with a funnel 16 for convenience in filling. Below this supply-pipe at the bottom of the tank is shown a discharge-pipe 17, provided with a cock 18. In one side of the casing are illustrated double doors C' C², the first of which is in the inner wall and is preferably of glass and the other of wood and situated in the outer wall.

Transversely of the casing, in proximity to the door and a short distance above the tank, extends a center cleat 19 and side cleats 20 20, upon which are supported the egg-trays 21 21. These trays have side walls 22, of a convenient height, and transverse partitions 23, forming compartments in which the eggs may be laid in rows. The side wall of each tray adjacent to the casing-doors is preferably slotted at 24 and provided with a finger-hole at 25, through which access may be had to an independent or false bottom section 25ª, movable below the partitions 23, which are supported sufficiently from the bottom of the tray to permit this. This false bottom, which may be conveniently made of cardboard, is shown as provided with end sections 25ᵇ 25ᵇ, which may be movably attached by hinges 25ᶜ, composed of strips of fabric glued to the adjacent edges.

Through the casing-walls just above the top of the tank, here shown as at opposite ends, are pairs of ventilating or induction openings 26 26, through which air enters, and escapes through a discharge-opening 27, preferably situated at substantially the center of the top of the casing. Between the egg-trays and the discharge-opening is a deflecting-plate 28, reaching well toward the side walls of the casing and supported upon blocks 29, depending from the top. About the opening 27 is a valve-casing 30, upon which operates a valve 30ª, hinged thereto at 31. Through this valve extends a screw 32, threaded into the upper extremity of a depending rod 33, to the lower end of which is articulated the horizontal arm of a bell-crank lever 34, fulcrumed at 34ª upon the under side of the deflector. Secured to the other arm of this lever is a tension member 35, which may consist of a band of soft rubber secured in a slot of an adjusting member or key 36, rotatably mounted in a support 37, fixed to the deflector below one of its carrying-blocks.

In the use of our improved incubator we preferably introduce into the tank a suitable quantity of a hot fluid, usually boiling water, which will but partly fill it. This warms the air entering through the openings 26 to the proper degree, and it rises and surrounds the eggs which have been placed in rows in the trays. If the temperature of this air becomes unduly high, the tension member overcoming the weight of the other elements of the valve-controlling mechanism slightly raises the valve and permits some of the air to escape, this passing out over the edges of the deflecting-plate, which causes it to be quite uniformly distributed about the eggs. As the heat decreases the tension member expands and the valve gradually closes, this heat-controlling mechanism being adjusted to proper operation by turning either the screw 32 or the key 36 of its actuating mechanism. After a certain interval, usually of about half a day, we introduce a further supply of hot water, which gives sufficient heat to maintain the incubator at the proper temperature for an additional twelve hours, or thereabout. At the end of this time the contents of the tank may be withdrawn through the discharge-pipe and a fresh supply of hot water introduced, as before.

When it is desired, the eggs may be rotated, as is necessary in artificial incubation, by moving the false bottom of each tray along through the slot in the side until the end section has been withdrawn. The eggs will all be rotated through substantially half a turn. The hinging of this section permits it to hang vertically from the tray and avoids the closing of the space between it and the walls at its side.

Although the regulator illustrated is preferred by us, other forms may be successfully used in our incubator, and we desire to limit ourselves in this respect only as set forth in the claims.

Having thus described our invention, we claim as new and desire to secure by Letters Patent—

1. In an incubator, the combination with a casing provided with an opening in the upper portion and a source of heat, of an egg-tray supported above said source of heat, and a deflector supported upon the casing-top and interposed between the egg-trays and the opening, said deflector being separated from each of the side walls of the casing.

2. In an incubator, the combination with a casing provided with an opening in the upper portion and a source of heat, of an egg-tray supported above said source of heat, a deflector interposed between the egg-tray and the opening, and temperature-controlling mechanism and actuating mechanism therefor supported upon the deflector between it and the egg-tray and being situated within the casing.

3. In an incubator, the combination with a casing, of a tray and a movable bottom section for said tray provided with a hinged edge section.

4. In an incubator, the combination with a casing, of a tray having a slotted end wall and transverse partitions, and a bottom movable through the slot in the tray-wall and beneath the partitions.

5. In an incubator, the combination with a casing, of a tray having a slotted end wall, and a bottom provided with a hinged end section adjacent to the slot in the tray-wall.

In witness whereof we have signed our names to this specification in the presence of two subscribing witnesses.

CHARLES EDWARD GOSS.
GEORGE WILSON GOSS.

Witnesses:
S. B. ARNETT,
H. B. BLACKWELL.